US011848902B2

(12) United States Patent
Parkinson et al.

(10) Patent No.: US 11,848,902 B2
(45) Date of Patent: Dec. 19, 2023

(54) UNSUBSCRIBE AND DELETE AUTOMATION

(71) Applicant: Allstate Insurance Company, Northbrook, IL (US)

(72) Inventors: John S. Parkinson, Lake Forest, IL (US); Marvin Lu, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/832,153

(22) Filed: Jun. 3, 2022

(65) Prior Publication Data

US 2023/0139128 A1 May 4, 2023

Related U.S. Application Data

(63) Continuation of application No. 16/535,998, filed on Aug. 8, 2019, now Pat. No. 11,374,889, which is a (Continued)

(51) Int. Cl.
| | |
|---|---|
| *H04L 51/212* | (2022.01) |
| *H04L 67/306* | (2022.01) |
| *H04L 51/046* | (2022.01) |
| *H04W 60/00* | (2009.01) |
| *H04W 60/06* | (2009.01) |
| *H04W 8/18* | (2009.01) |
| *G06F 16/9535* | (2019.01) |
| *H04W 8/20* | (2009.01) |
| *H04L 51/42* | (2022.01) |
| *H04L 67/30* | (2022.01) |

(52) U.S. Cl.
CPC ........ *H04L 51/212* (2022.05); *G06F 16/9535* (2019.01); *H04L 51/046* (2013.01); *H04L 51/42* (2022.05); *H04L 67/30* (2013.01); *H04L 67/306* (2013.01); *H04W 8/18* (2013.01); *H04W 8/20* (2013.01); *H04W 60/00* (2013.01); *H04W 60/06* (2013.01)

(58) Field of Classification Search
CPC ..... H04L 51/12; H04L 51/22; H04L 63/0227; H04L 67/02; H04L 67/26; G06Q 30/016
See application file for complete search history.

(56) References Cited

U.S. PATENT DOCUMENTS

| | | |
|---|---|---|
| 6,249,807 B1 | 6/2001 | Shaw et al. |
| 6,321,267 B1 | 11/2001 | Donaldson |
| (Continued) | | |

FOREIGN PATENT DOCUMENTS

CN 105139182 A 12/2015

OTHER PUBLICATIONS

Feb. 24, 2021—U.S. Advisory Action -U.S. Appl. No. 16/535,998 (006591.02217).
(Continued)

*Primary Examiner* — Michael A Keller
(74) *Attorney, Agent, or Firm* — Brooks Kushman P.C.

(57) ABSTRACT

Methods, computer-readable media, software, and apparatuses may assist a consumer m unsubscribing from unwanted mailing list traffic and email based relationships. A consumer's discovered accounts and subscriptions may be listed and displayed to the consumer. For each identified account or subscription, an unsubscribe and deletion action may be determined and automated for the consumer.

17 Claims, 6 Drawing Sheets

Related U.S. Application Data continuation-in-part of application No. 16/359,489, filed on Mar. 20, 2019, now Pat. No. 11,196,693.

(56) References Cited

U.S. PATENT DOCUMENTS

| | | | |
|---|---|---|---|
| 7,596,600 | B2 | 9/2009 | Quine et al. |
| 7,620,690 | B1 | 11/2009 | Castelli |
| 7,716,242 | B2 | 5/2010 | Pae et al. |
| 7,853,657 | B2 | 12/2010 | Martin |
| 7,996,530 | B1 | 8/2011 | Hogeboom et al. |
| 8,032,600 | B2 | 10/2011 | Paul |
| 8,255,468 | B2 | 8/2012 | Vitaldevara et al. |
| 8,560,619 | B1 | 10/2013 | Houston et al. |
| 8,726,349 | B2 | 5/2014 | Kavantzas et al. |
| 8,874,658 | B1 | 10/2014 | Khalsa et al. |
| 8,935,342 | B2 | 1/2015 | Patel |
| 8,949,462 | B1 | 2/2015 | Djabarov et al. |
| 9,536,108 | B2 | 1/2017 | Powell et al. |
| 10,354,750 | B2 | 7/2019 | Laborde |
| 2005/0188025 | A1 | 8/2005 | Landau et al. |
| 2006/0041505 | A1* | 2/2006 | Enyart ............... H04L 12/1467 705/40 |
| 2008/0115226 | A1 | 5/2008 | Welingkar et al. |
| 2009/0100099 | A1 | 4/2009 | Buckwalter |
| 2010/0106645 | A1 | 4/2010 | Peckover |
| 2010/0198927 | A1 | 8/2010 | Tonnison et al. |
| 2011/0161159 | A1 | 6/2011 | Tekiela et al. |
| 2012/0227097 | A1 | 9/2012 | Nakhjiri |
| 2013/0024520 | A1 | 1/2013 | Siminoff |
| 2013/0275306 | A1 | 1/2013 | Ignatchenko et al. |
| 2013/0091042 | A1 | 4/2013 | Shah et al. |
| 2013/0238721 | A1* | 9/2013 | Patel ..................... H04L 51/212 709/206 |
| 2014/0372196 | A1 | 12/2014 | Arthur |
| 2015/0081488 | A1 | 3/2015 | Turner et al. |
| 2015/0161210 | A1 | 6/2015 | Cook et al. |
| 2015/0294349 | A1 | 10/2015 | Capel et al. |
| 2015/0381533 | A1 | 12/2015 | Klemm et al. |
| 2016/0196451 | A1 | 7/2016 | Le Jouan |
| 2016/0364963 | A1 | 12/2016 | Matsuka et al. |
| 2017/0070484 | A1 | 3/2017 | Kruse et al. |
| 2017/0180797 | A1 | 6/2017 | Splaine et al. |
| 2017/0193624 | A1 | 7/2017 | Tsai |
| 2017/0199920 | A1 | 7/2017 | Pearson et al. |
| 2017/0285896 | A1 | 10/2017 | Chandra et al. |
| 2017/0287035 | A1 | 10/2017 | Barday |
| 2017/0310821 | A1 | 10/2017 | Cook |
| 2017/0316225 | A1 | 11/2017 | Smith et al. |
| 2017/0323026 | A1 | 11/2017 | Le Bras et al. |
| 2017/0372301 | A1 | 12/2017 | Theurer et al. |
| 2018/0026996 | A1 | 1/2018 | Park et al. |
| 2018/0091521 | A1 | 3/2018 | Pachouri et al. |
| 2018/0314761 | A1 | 11/2018 | Lewin-Eytan et al. |
| 2018/0329940 | A1 | 11/2018 | Tiku et al. |
| 2018/0341784 | A1 | 11/2018 | Barday et al. |
| 2019/0342336 | A1 | 11/2019 | Finkelstein et al. |
| 2021/0014218 | A1 | 1/2021 | Kurylko et al. |

OTHER PUBLICATIONS

Mar. 18, 20218—U.S. Final Office Action—U.S. Appl. No. 16/359,489 (006591.01883).

Mar. 25, 2021—U.S. Non-Final Office Action—U.S. U.S. Appl. No. 16/535,998 (006591.02217).

Spiceworks (How to view a detail report of inactive users in office 365, by Darkxenorider on Jul. 29, 2013, relied upon 1 ?mment dated Mar. 15, 2018, retrieved from https://community.spiceworks.com/topic/364025-how-to-view-a-detail-reportPf-inactive-users-in-office-365 on Nov. 21, 2020). (Year: 2018).

Nov. 27, 2020—U.S. Non-Final Office Action—U.S. Appl. No. 16/359,489 (006591.01883).

Dec. 10, 2020—U.S. Final Office Action—U.S. Appl. No. 16/535,998 (006591.02217).

Sep. 8, 2020 U.S. Non Final Office Action Appn U.S. Appl. No. 16/535,998 (006591.02217).

Jun. 16, 2020—(WO) International Search Report & Written Opinion—PCT/US20/23840 (006591.02369).

Unsubscription: A Simple Way to Ease Overload in Email, https://ldl.acm.org/citation.cfm?id=3159698 (2 pages) Aug. 29, 2018.

How to Unsubscribe from Mailing Lists and Junk Newsletters in Gmail, https://www.labnol.org/interneUgmail-unsubscribe/28806/ (8 pages) Aug. 29, 2018.

3 Ways to Unsubscribe from Email Newsletters in Gmail, © 2007-2018 Uqnic Network Pte Ltd., https://www_maketecheasier.com/unsubscribe-email-newsletters-gmail/ (20 pages) Aug. 29, 2018.

Easy Ways to Unsubscribe Unwanted Emails, https://www.tutorialspoint.com/articles/easy-ways-to-unsubscribe-unwanted-emails-2, (6 pages), Aug. 29, 2018.

Unsubscriber The Easiest Way to Stop Unwanted Email, https://getunsubscriber.com (7 pages) Aug. 29, 2018.

3 Tools That Easily Unsubscribe You from Emails, https://www.pcworld.com/article/3181014/software/3-tools-for-easily-unsubscribing-to-emails.html (6 pages) Mar. 22, 2017.

3 Best Tools to Auto-Unsubscribe from Marketing Emails, https://www.guidingtech.com/27356/auto-unsubscribe-marketing-emails (6 pages) 2018 Guiding Media Pvt Ltd.

Gmail Offers to Automatically Unsubscribe You from Mailing Lists, https://lifehacker.com/5319723/gmail-offers-to-automatically-unsubscribe-you-from-mailing-lists (5 pages) Jul. 22, 2009.

How to Use iOS Mail's Auto Unsubscribe Feature, https://www.cultofmac.com/492680/how-to-use-ios-mail-auto-unsubscrive-feature/, (36 pages) Jul. 14, 2017.

Cisco Email Security—Graymail Management and Safe Unsubscribe, https://www.cisco.com/go/emailsecurity, (3 pages) 2018 Cisco.

May 6, 2020—U.S. Non-Final Office Action—U.S. Appl. No. 16/359,489 (006591.01883).

Aug. 24, 2020—U.S. Final Office Action—U.S. Appl. No. 16/359,489 (006591.01883).

* cited by examiner

UNSUBSCRIBE AND DELETE AUTOMATION

CROSS-REFERENCE TO RELATED APPLICATIONS

This application is a continuation of U.S. application Ser. No. 16/535,998 filed Aug. 8, 2019, now U.S. Pat. No. 11,374,889, issued Jun. 28, 2022, which is a continuation-in-part of U.S. application Ser. No. 16/359,489 filed Mar. 20, 2019, now U.S. Pat. No. 11,196,693, issued Dec. 7, 2021, the disclosures of which are hereby incorporated in their entirety by reference herein.

TECHNICAL FIELD

Aspects of the disclosure generally relate to methods and computer systems, including one or more computers particularly configured and/or executing computer software. More specifically, aspects of this disclosure relate to methods and systems for unsubscribing and/or deleting a consumer from digital accounts or subscriptions.

BACKGROUND

Protecting confidential information in today's online environment is difficult due to the increased connectivity and the increased number of consumer accounts accessible via web enabled computing devices. Consumers today have a large number of online subscriptions and accounts and keeping track of all of them is difficult and time consuming. Many consumers have subscriptions and digital or web-based accounts that they have long forgotten about but those subscriptions and accounts may still be active, may contain personal information, and may be accessible online. It is important from a digital safety perspective that consumers be aware of all of their online accounts and be diligent in closing unused or no longer wanted subscriptions.

For each of these unused or unwanted accounts or subscriptions, a consumer may continue to receive unwanted emails and/or other communications. However, for consumers, unsubscribing and/or deleting unused or no longer needed accounts and subscriptions can be difficult.

Website owners provide privacy policies that may contain opt-out provisions that detail how to unsubscribe or delete an account, but finding such information is difficult and time consuming. Unsubscribing details may also be found in email list services or in marketing communications, but such unsubscribing details may be confusing and burdensome for consumers to implement. Therefore, there is a need for a simpler and more efficient approach to unsubscribing for consumers.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for use by a consumer in order to discover and remove unwanted mailing list traffic and digital communication based relationships associated with a consumer's discovered accounts and subscriptions. In an embodiment, for each identified account or subscription, an unsubscribe and deletion method may be determined and implemented for the consumer. Discovered accounts and subscriptions may be listed and displayed to the consumer along with recommendations and assistance for closing and purging any discovered unused or unwanted accounts and subscriptions, including any data associated with those accounts and subscriptions.

In some aspects, the system may include at least one processor and a memory unit storing computer-executable instructions. The system may be configured to, in operation, determine the actual unsubscribe dialog or deletion criteria required for each requested action and execute the requested action using the appropriate method. The system may also be configured to, in operation, handle exceptions, report results, and transmit confirmations that the requests were successfully completed. The system may be configured to, in operation, create log records of the transactions.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for unsubscribing a consumer from emails or other communications provided by vendors or institutions having accounts or subscriptions related to the consumer. In addition, methods, computer-readable media, software, and apparatuses are disclosed for deleting and purging any discovered accounts or subscriptions of the consumer, along with deleting and purging any of the consumer's personal information associated with those accounts or subscriptions.

A vendor or institution, also referred to herein as an entity, may maintain a privacy policy that describes how a consumer's personal data is collected and shared, whether a consumer can opt in/out of the collection of data, and/or whether a consumer can delete the collected personal data, for example. Personal data may include information such as the consumer's name, address, age, telephone number, email address, and products/services searched for, among others. The privacy policy opt-out instructions may also describe how a consumer can unsubscribe to the account or subscription.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
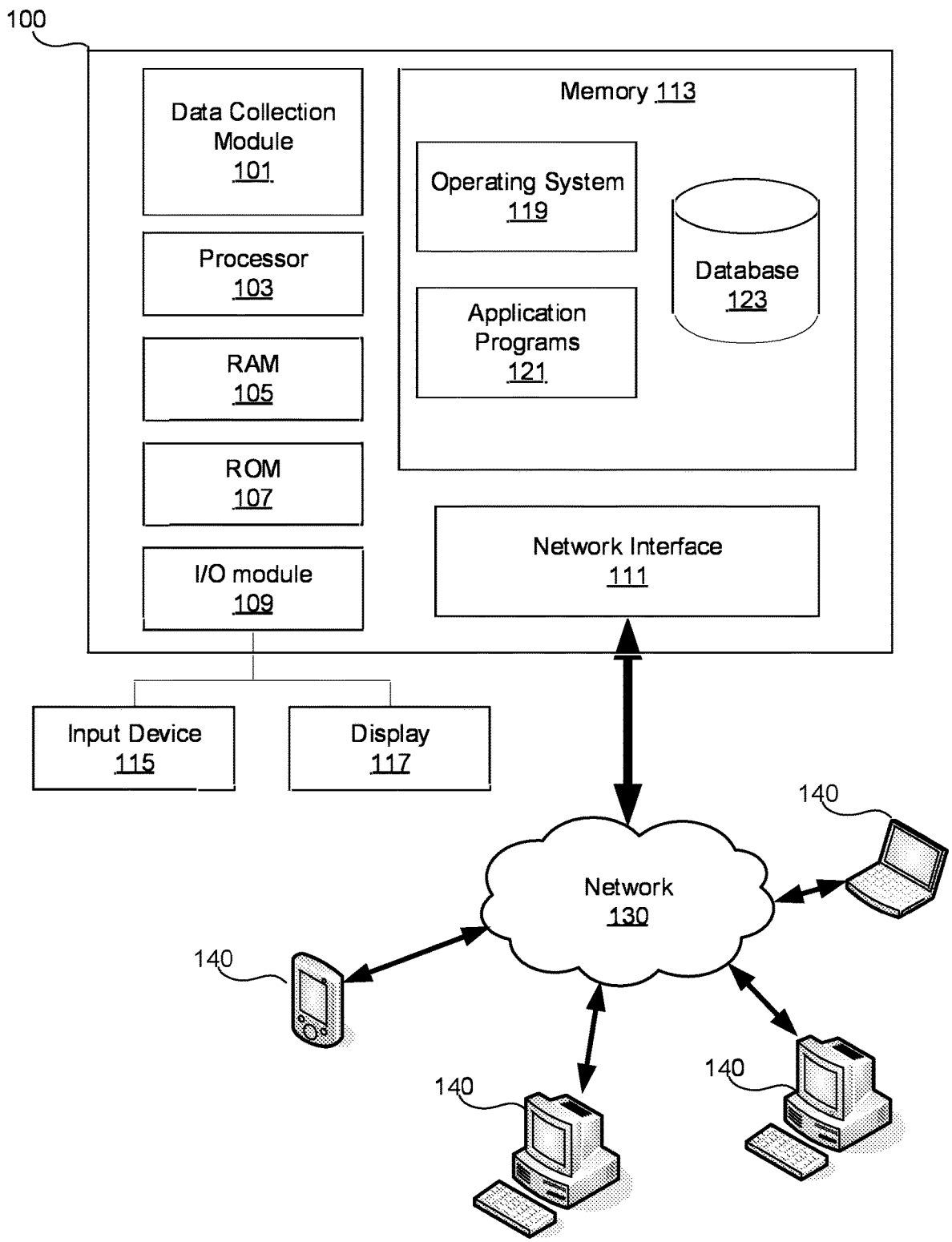
FIG. 1 illustrates an example cyber-privacy device that may be used in accordance with one or more aspects described herein.

In one or more arrangements, aspects of the present disclosure may be implemented with a computing device. FIG. 1 illustrates a block diagram of an example cyber-privacy device 100 that may be used in accordance with aspects described herein. The cyber-privacy device 100 may be a computing device, such as a personal computer (e.g., a desktop computer), server, laptop computer, notebook, tablet, smartphone, vehicles, home management devices, home security devices, smart appliances, etc. The cyber-privacy device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, cyber-privacy device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the cyber-privacy device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the cyber-privacy device 100 may provide input data. The I/O module 109 may also be configured to be connected to a display device 117, such as a monitor, television, touchscreen, etc., and may include a graphics card. The display device 117 and input device 115 are shown as separate elements from the cyber-privacy device 100; however, they may be within the same structure. On some cyber-privacy devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the cyber-privacy device 100 to perform various functions. For example, memory 113 may store software used by the cyber-privacy device 100, such as an operating system 119 and application programs 121, and may include an associated database 123.

The network interface 111 may allow the cyber-privacy device 100 to connect to and communicate with a network 130. The network 130 may be any type of network, including a local area network (LAN) and/or a wide area network (WAN), such as the Internet, a cellular network, or a satellite network. Through the network 130, the cyber-privacy device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as cyber-privacy device 100. In some embodiments, the cyber-privacy device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
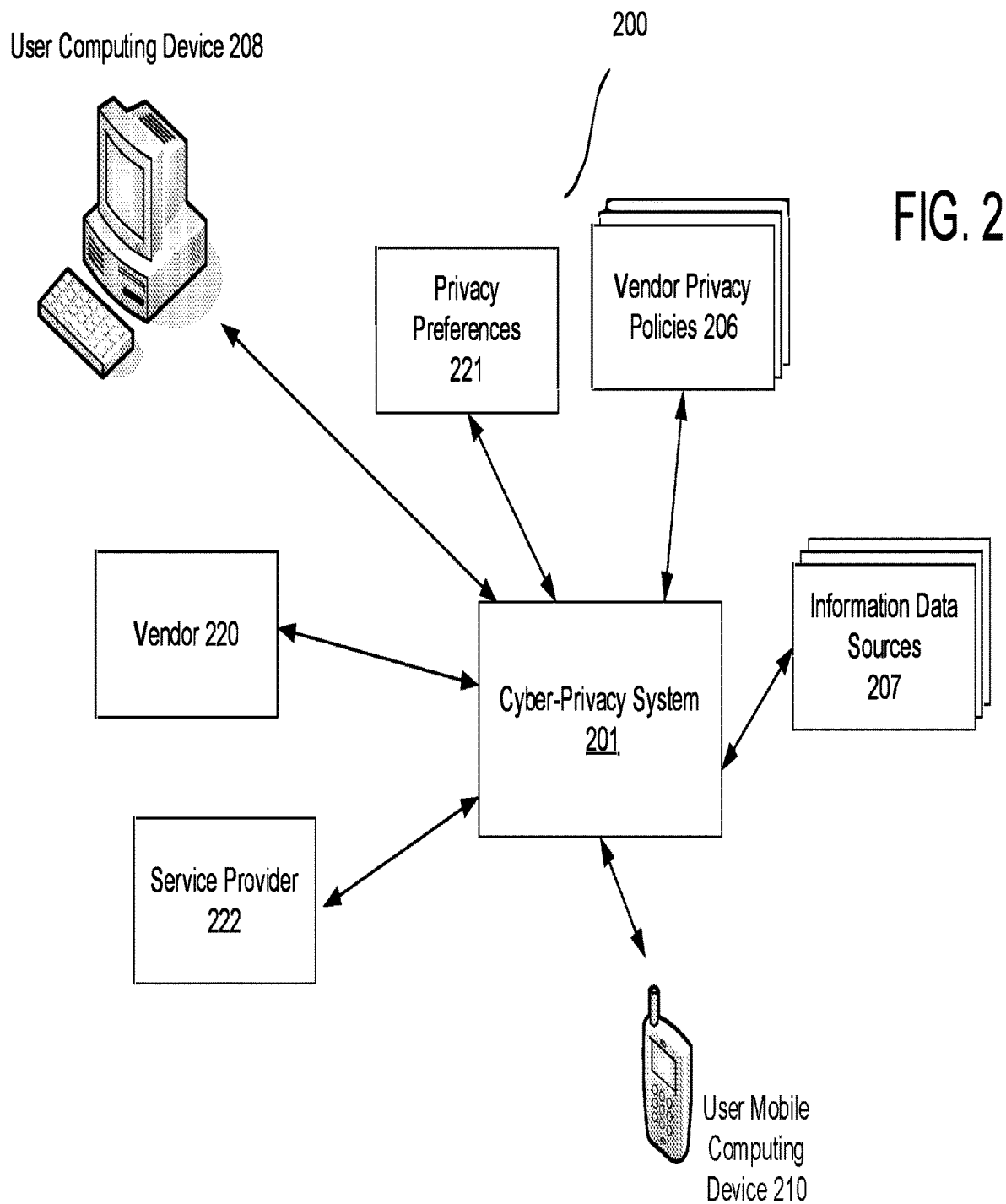
FIG. 2 shows a diagram illustrating the system architecture for a cyber-privacy system in accordance with one or more aspects described herein.

FIG. 2 shows a block diagram illustrating system architecture 200 for a cyber-privacy system 201. In some embodiments, the cyber-privacy system 201 may be implemented as part of a proxy server. In some other embodiments, the cyber-privacy system 201 may be implemented in a virtual private network (VPN) endpoint. In some embodiments, the cyber-privacy system 201 may be implemented as part of a cyber-privacy platform or as part of a digital safety framework. In some instances, the cyber-privacy system 201 may be a cyber-privacy device 100.

In an aspect of the disclosure, cyber-privacy system 201 provides relationship discovery through analysis of a consumer's data. In an embodiment, cyber-privacy system 201 may determine and analyze relationship activity of a consumer using a variety of metrics (recency, frequency, interaction intensity) to offer suggestions as to which relationships are likely to be stale and which ones can be safely removed. In an embodiment, cyber-privacy system 201 may use deep scanning to analyze relationship history and frequency of messages received and sent. In an embodiment, cyber-privacy system 201 may determine that relationships where there has been no inbound (received) or outbound (sent) traffic for over twelve months may be classified as stale relationships. Cyber-privacy system 201 may recommend that these identified stale relationships be discarded.

In yet another embodiment, cyber-privacy system 201 may determine that relationships are stale if the current received email frequency is significantly less than the historic frequency. For example, when historic email frequency is monthly (or a more frequent interval) but recent frequency analysis shows no traffic for three months, cyber-privacy may recommend discarding the relationship. In an embodiment, cyber-privacy system 201 may have different defaults for different types of accounts and/or subscriptions and/or may allow consumers to use their own preferred values.

The cyber-privacy system 201 may collect information from, and transmit information to, a consumer through various different channels, such as via a user mobile computing device 210, or via a user computing device 208. In some embodiments, the cyber-privacy system 201 may receive a request from a consumer for a product or service and may transmit the request to a vendor identified by the request. In other embodiments, cyber-privacy system 201 may receive a request from a consumer to unsubscribe or delete an existing account or subscription.

For example, a consumer may still be receiving email communications from a service provider 222 based on a prior existing relationship with the service provider 222. The relationship may have ended but the consumer may still be receiving information related to the relationship from the service provider 222. In such an instance, the consumer may want to unsubscribe to the email listing service of the service provider 222, as the communications are no longer relevant to the consumer.

In another example, a consumer may want to delete an unused account with a service provider 222 based on inactivity. In such an instance, the consumer may want to ensure that the unused account is properly closed, and the corresponding consumer data deleted, so that the associated account number or other information related to the account is not stolen and used by identity thieves.

In an aspect of the disclosure, cyber-privacy system 201 may upon consumer activation automatically unsubscribe the consumer from the email list services or marketing communications of the service provider 222. In an embodiment, cyber-privacy system 201 may receive a consumers request to unsubscribe and determine the appropriate unsubscribe link or email address for the target relationship and automatically complete the unsubscribe process for the consumer.

In another example, vendor 220 may be sending emails or other correspondence to a consumer regarding a no longer utilized consumer subscription. The consumer may want to unsubscribe with vendor 220 to cancel any further correspondence from being delivered. In an embodiment, cyber-privacy system 201 may, after receiving a request from a consumer to unsubscribe from vendor 220's correspondence, parse discovered electronic correspondence from vendor 220 to determine or detect an unsubscribe link or an unsubscribe email address. In an aspect of the disclosure, cyber-privacy system 201 may determine the unsubscribe method being used for the target relationship and automatically complete the unsubscribe process for the consumer. In an embodiment, the detection of an unsubscribe link or an unsubscribe email address in an electronic correspondence may provide a strong indication that the electronic correspondence in not a personal correspondence.

In another aspect of the disclosure, cyber-privacy system 201 may upon consumer activation automatically begin an account purge process so that a consumer may delete their data obtained by third parties. In an embodiment, such third parties may be using or selling the received consumer data without consumer consent.

Cyber-privacy system 201 may retrieve information from a plurality of information data sources 207 in order to determine the digital presence of a consumer. A data retrieval engine may be configured to monitor (e.g., continuously monitor) each of the information data sources 207 and report data of interest from any one of these data sources to the cyber-privacy system 201. For example, the data retrieval engine may interface with one or more digital accounts (banking accounts, social media accounts, digital storefronts, etc.) to determine if accounts are created, active, and/or in use.

In some additional embodiments, cyber-privacy analysis system 201 may generate a listing for the consumer of discovered online accounts associated with the consumer. The accounts may be categorized into various groups such as financial accounts and subscriptions associated with the consumer. The categorized listings may assist a consumer in keeping track of their numerous online accounts all of which may contain various forms of confidential information. In an embodiment, the account listing may be filtered in numerous ways to provide insights. For instance, the listing of accounts may be filtered to show all accounts that show the consumer's location or share the consumer's financial information.

In an embodiment, cyber-privacy system 201 may monitor a consumer's email accounts to determine a listing of the consumer accounts with companies or institutions. Similarly, a consumer's email accounts may also be monitored to determine the number of online subscription accounts associated with the consumer.

In an embodiment, cyber-privacy system 201 may generate separate lists for a consumer listing all of the consumer's discovered accounts and all of the consumer's online subscriptions. The generated lists may be used to assist the consumer in closing unused or unwanted accounts in order to reduce the risk of confidential information being obtained and prevent unauthorized use of accounts a user may have long forgotten about. In another embodiment, cyber-privacy system 201 may upon discovery of consumer's accounts allow the consumer to globally change information such as a consumer address or phone number across all of the discovered accounts simultaneously. The aggregation and consolidation mechanism of the present disclosure may allow a consumer to update and manage numerous accounts efficiently.

In an embodiment, consumer privacy preferences 221 may represent the privacy preferences of a consumer. In some embodiments, the consumer privacy preferences 221 may be associated with the computing device sending the request, for example, user computing device 208. In some embodiments, the consumer privacy preferences 221 may have been previously stored by the cyber-privacy system 201, for example, in a local database. In other embodiments, consumer privacy preferences 221 may be received by cyber-privacy system 201 as part of the request sent by the consumer. In still other embodiments, cyber-privacy system 201 may retrieve the consumer privacy preferences 221 from a computing device via a network, for example, after receiving the request from the consumer. In some embodiments, the cyber-privacy system 201 may be configured with artificial-intelligence capabilities to understand a consumer's preference based on consumer's usage over time. In an embodiment, consumer privacy preferences 221 may include a consumer's preferences for handling cleanup of discovered unused or unwanted accounts and subscriptions. For instance, consumer privacy preferences 221 may include consumer set preferences for handling unsubscribing and/or deletion automation of discovered accounts and subscriptions.

In an embodiment, vendor privacy policies 206 may include privacy policies of one or more vendors. Vendor privacy policies 206 may include the privacy policy associated with the vendor website for various accounts and subscriptions. For example, the privacy policy associated with the vendor 220 may have been previously stored by the cyber-privacy system 201, for example, in a local database. In some other embodiments, the privacy policy associated with the vendor 220 may be retrieved from the vendor website, or from another location, for example, after receiving the request from the consumer. In various embodiments, the cyber-privacy system 201 may process or translate one or more vendor privacy policies into an internal format.

In some embodiments, the consumer privacy preferences 221 may include information related to one or more privacy categories. The vendor privacy policies 206 may be compared to the consumer privacy preferences 204 by comparing information in each of the privacy categories. In some embodiments, the privacy categories may include categories generally related to data collection, data usage and data management. As an example, the consumer privacy preferences 221 may indicate that the consumer does not want collected personal data to be shared by the vendor. In another example, the consumer privacy preferences 221 may indicate that the consumer wants to be able to delete collected personal data stored by the vendor. In still another example, the consumer privacy preferences 221 may indicate that the consumer wants to be able to opt in, or opt out of, having their personal data collected by the vendor. The vendor privacy policy 206 may include information indicating the vendor's policy related to one or more of these privacy categories.

In some embodiments, the cyber-privacy system 201 may store a consumer profile for one or more consumers that includes the consumers' privacy preferences. In these embodiments, the cyber-privacy system 201 may keep an account for each consumer and may identify the consumer when the consumer logs in or submits other identifying information. In other embodiments, the consumer privacy preferences may be received by the cyber-privacy system 201 when a consumer sends a request for a product or service. In such embodiments, the cyber-privacy system 201 may not need to maintain an account for each user.

In some embodiments, the cyber-privacy system 201 may output, for display to a consumer, a listing of all the discovered accounts or subscriptions. The listing may include the age of the account or subscription and the last time the account or subscription was utilized.

In some embodiments, the cyber-privacy system 201 may track a consumer's online communications with various websites over time, for example, in order to gather a consumer's digital footprint. In some embodiments, the cyber-privacy system 201 may perform an analysis on the gathered digital footprint to assess alignment between the associated vendor privacy practices and a consumer's privacy preferences. In some embodiments, the analysis may be triggered based on a change in a consumer's privacy preferences. In other embodiments, the analysis may be triggered by a request, from a consumer, to do so. In some other embodiments, the analysis may be triggered based on an elapsed time since a previous analysis was performed. In some other embodiments, the analysis may be triggered by a change in one or more vendor privacy practices.

In an aspect of the disclosure, cyber-privacy system 201 may discover and maintain a link to an unsubscribe relationship page for each discovered account or subscription. In an embodiment, cyber-privacy system 201 may determine an unsubscribe link and unsubscribe relationship page during an initial account scan and relationship determination process. In another embodiment, an unsubscribe link and unsubscribe relationship page may be determined during analysis of a webpage's privacy statement or analysis of an email list services website. In some embodiments, cyber-privacy system 201 may determine an email address for unsubscribing by analyzing an email header. For example, an email header of a marketing communications email may include an email address for unsubscribing from future marketing emails.

In an embodiment, a uniform resource locator (URL) for each unsubscribe link and the determined unsubscribe method associated with each account and subscription may be stored by cyber-privacy system 201. In the event that no method for unsubscribing can be determined, cyber-privacy system 201 may compare each account or subscription to similar accounts or subscriptions to determine an unsubscribe method. In an embodiment, if an unsubscribe process cannot be determined cyber-privacy system 201 may list the unsubscribe method as manual or blocked.

In an aspect of the disclosure, cyber-privacy system 201 may provide a method by which a consumer can request an unsubscribe action for at least one relationship. In an embodiment, cyber-privacy system 201 may confirm each unsubscribe request. The request may be initiated by a consumer through a user interface screen generated by cyber-privacy system 201 and displayed on user computing device 208. In another embodiment, a consumer may initiate an unsubscribe request from the generated account and/or subscription listing displayed to the consumer by cyber-privacy system 201.

In an embodiment, cyber-privacy system 201 may retrieve the actual unsubscribe dialog required for each requested action from storage and execute the appropriate action to unsubscribe. Cyber-privacy system 201 may provide an indication to the consumer that the unsubscribe action was successfully completed. If an exception occurs, cyber-privacy system 201 may handle the exception and notify the consumer. For example, cyber-privacy system 201 may determine that the method to unsubscribe to an account has been changed or updated by the account provider.

In an embodiment, cyber-privacy system 201 may determine the new updated process for the account and automatically unsubscribe the consumer using the new or updated process. In another embodiment, cyber-privacy system 201 may make numerous attempts to unsubscribe a consumer from an account over a predetermined time period, should the account's website be temporarily unavailable.

If cyber-privacy system is unsuccessful in unsubscribing, a communication or indication may be supplied to alert the consumer. In an embodiment, where an automatic unsubscribe action cannot be completed, the consumer may receive information from cyber-privacy system 201 on how to manually unsubscribe to the account or subscription. In an embodiment, cyber-privacy system 201 may generate a log to track unsubscribe outcomes.

In an aspect of the disclosure, cyber-privacy system 201 may scan emails for unsubscribe indicators in any consumer received communication. For instance, the word "unsubscribe" may be found upon parsing of the communication. In some communications, the word "unsubscribe" may be found in the header or footer block of the communication. For example, many emails have the unsubscribe language located in the footer block. In an embodiment, the unsubscribe language may include an embedded link to an unsubscribe dialog page.

In an embodiment, cyber-privacy system 201 may parse an email communication to determine a link to an unsubscribe page for an account or subscription. In an embodiment, if the link includes a parameter string, the parameter string may be analyzed to determine what values are to be passed in order to unsubscribe.

In an aspect of the disclosure, cyber-privacy system 201 may determine the information needed to unsubscribe. In an embodiment, a consumer's email address or other identifying information may be needed to unsubscribe from an account or subscription. For example, cyber-privacy system 201 may need to transmit a consumer's email address to an unsubscribe page. The transmission and receipt of the consumer's email address may act as a control parameter triggering the unsubscribe action. In an embodiment, the unsubscribe page may refresh and provide a completion message. The completion or confirmation message may be displayed. Cyber-privacy system 201 may store the completion or confirmation message and provide the consumer with an indication that the unsubscribe action has been successful.

In another embodiment, cyber-privacy system 201, after transmitting the consumer's email address and/or other identifying information, may confirm that the consumer wishes to initiate the unsubscribe action. In such an instance, cyber-privacy system 201 may transmit a confirmation to unsubscribe from the account or subscription. If needed, cyber-privacy system 201 may store any changes.

In another aspect of the disclosure, cyber-privacy system 201, after initiating the unsubscribe process, may request that the consumer enter some particular consumer data required by the account or subscription. In such an instance, cyber-privacy system 201 may provide a user interface screen for the consumer to enter any such required information.

In yet another aspect of the disclosure, cyber-privacy system 201 may have to deselect different email content types in order to unsubscribe. In an embodiment, cyber-privacy system 201 may select an "unsubscribe from all" option to successfully unsubscribe to all email communications for a particular account or subscription.

In an aspect of the disclosure, cyber-privacy system 201 may parse the content of an email communication for key words such as "Cancel" or "Remove" or "Delete". In an embodiment, it may be necessary to explicitly save changes to trigger an unsubscribe or account deletion request. In another embodiment, a confirmation of the request may be required. A successful result page may be displayed upon completion of the unsubscribe or deletion action. In some embodiments, deselecting all individual options may trigger the "unselect all" choice.

In another aspect of the disclosure, cyber-privacy system 201 may uncheck each of the communication type options because no "unsubscribe all" selection feature exists. In this scenario, cyber-privacy system 201 may save all of the changes and confirm the unsubscribe request. In yet another embodiment, cyber-privacy system 201 may have to select additional pages in order to reach the deselect list.

Cyber-privacy system 201 may include a reason for unsubscribing, if required by the unsubscribe process. The reason may be selected from a drop-down list or entered as free text. In some cases, the reason request may be embedded within the unsubscribe process but may be optional.

In an aspect of the disclosure, cyber-privacy system 201 may discover and maintain a link to a delete relationship page for each discovered account or subscription. In an embodiment, cyber-privacy system 201 may determine an account deletion process for each discovered account. In an embodiment, cyber-privacy system 201 may store and retrieve the deletion process required for each discovered account from storage and execute the appropriate deletion process upon consumer activation. In some embodiments, cyber-privacy system 201 may request input of consumer credentials, in order to use those credentials in completing the deletion process. In an embodiment, cyber-privacy system 201 may confirm each account delete request. The request may be initiated by a consumer through a user interface screen generated by cyber-privacy system 201 and displayed on user consumer device 208. In another embodiment, a consumer may initiate an account deletion request from the generated account and/or subscription listing displayed to the consumer by cyber-privacy system 201. Cyber-privacy system 201 may provide an indication to the consumer that the account deletion process was successfully completed. If an exception occurs, cyber-privacy system 201 may handle the exception and notify the consumer.

In another embodiment, cyber-privacy system 201 may make numerous attempts to delete a consumer account over a predetermined time period, should the account's website be temporarily unavailable. If cyber-privacy system 201 is unsuccessful in deleting an account, a communication or indication may be supplied to alert the consumer. In an embodiment where an automatic deletion action cannot be completed, the consumer may receive information from cyber-privacy system 201 on how to manually delete the account or subscription. In an embodiment, cyber-privacy system 201 may generate a log to track deletion outcomes.

Figure 3:
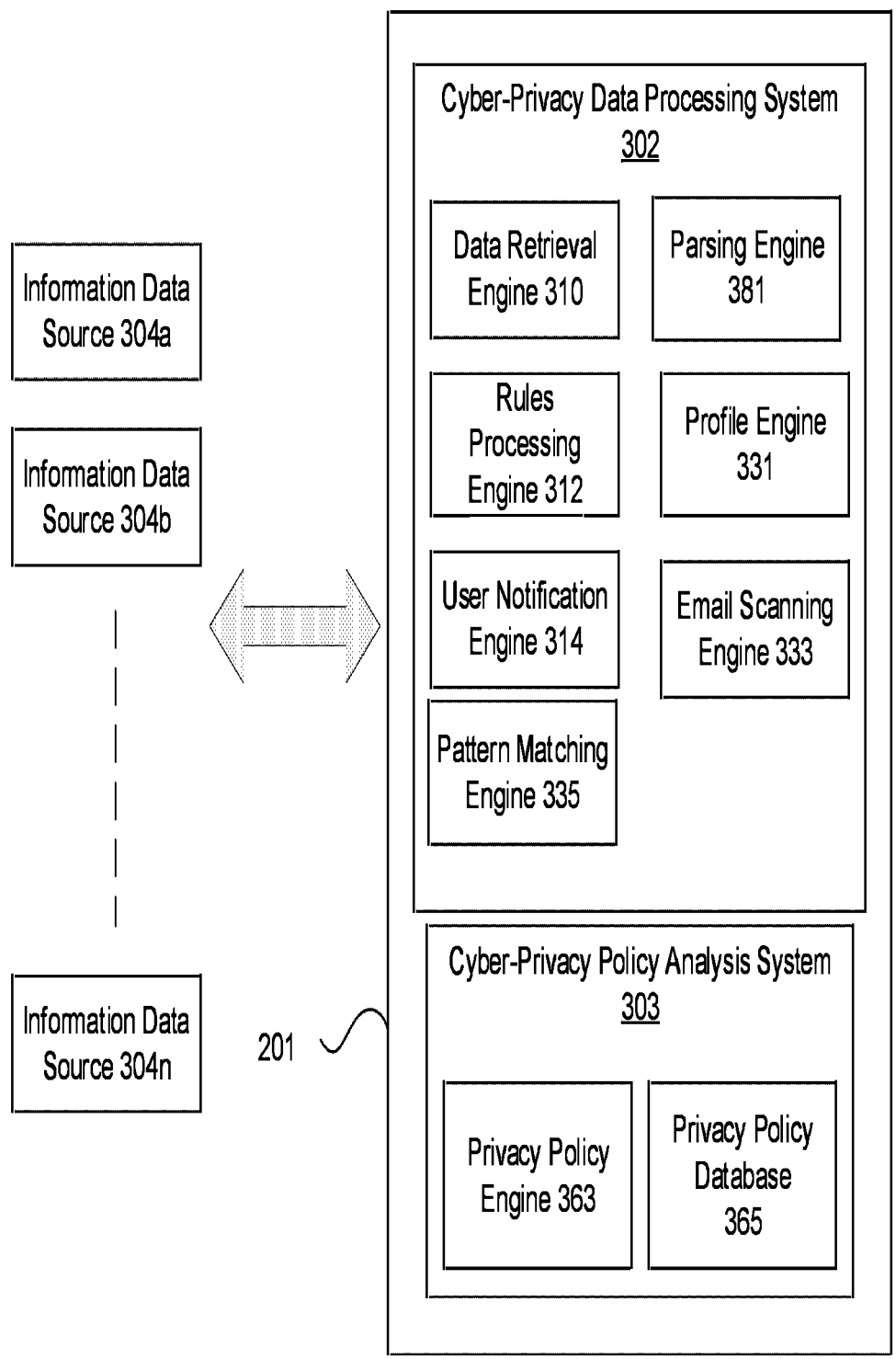
FIG. 3 illustrates a block diagram of a cyber-privacy system in accordance with one or more aspects described herein.

FIG. 3 illustrates a block diagram of particular portions of a cyber-privacy system 201. As shown in FIG. 3, the cyber-privacy system 201 may communicate with a plurality of information data sources 304a, 304b . . . 304n, to scan the email correspondences of a consumer to discover accounts and subscriptions of the consumer and to collect information related to the privacy policies of the various discovered accounts and subscriptions. In some embodiments, the information data sources 304a, 304b . . . 304n may include vendor website 220 and vendor website 222, illustrated in FIG. 2.

In some embodiments, the cyber-privacy system 201 may comprise a cyber-privacy data processing system 302 and a cyber-privacy privacy policy analysis system 303. In accordance with an aspect of the disclosure, cyber-privacy data processing system 302 may include an email scanning engine 333 and a pattern matching engine 335. In an embodiment, email scanning engine 333 may monitor at least one email account of the consumer. A consumer's email password and access information may have been provided by the user during an account setup process. The cyber-privacy system's parsing engine 381 may parse the metadata found in each email header to determine source information and/or unsubscribe information for each email correspondence in the consumer's email account. The parsed metadata may include a domain name identifying the source of the email correspondence and/or may include an email address for unsubscribing from future emails from the source. In an embodiment, monitoring of the consumer's email account may be limited to a user's inbox or specified folders containing email correspondence. In an embodiment, based on the determined source information for each email correspondence, cyber-privacy system 201 may generate a list of financial or other institutions associated with a consumer. The list of institutions may be verified with the consumer profile or other gathered information regarding the consumer. The list of institutions may be displayed to the consumer.

In an embodiment, cyber-privacy system 201 may determine for each email correspondence a likelihood that each email correspondence represents a subscription of the consumer. Cyber-privacy system 201 may in at least one embodiment, determine that an email contains references to an existing subscription based on results from a pattern recognition algorithm. The pattern recognition algorithm may search for various words, phrases, or other identifiable criteria. For instance, the pattern recognition algorithm may search for the word unsubscribe in an email correspondence indicating that the email correspondence is associated with an existing user account.

In another embodiment, based on the determined likelihood that each email correspondence represents a subscription of the consumer, cyber-privacy system 201 may generate a list of subscriptions associated with the consumer. The generated list of subscriptions may be displayed to the consumer and stored in the consumer profile record.

In an embodiment, cyber-privacy system 201 may automatically initiate closing of select accounts listed in one of the generated lists based on predetermined criteria. In some embodiments, the automatic closing of select accounts listed in one of the generated lists may be based on criteria chosen by the consumer. For instance, cyber-privacy system 201 may close accounts that have not been accessed for a predetermined period of time such as greater than one year. In another embodiment, cyber-privacy system 201 may generate recommendations based on the identification of the sources of the subscriptions. In another embodiment, the consumer may determine that various accounts should be closed based on a review of the listings. In this case, a consumer may indicate via a user interface that various accounts should be closed and cyber-privacy system 201 may begin an account closing process for the consumer.

In an embodiment, cyber-privacy data processing system 302 may generate a consumer profile at profile engine 331. The consumer profile may be generated using at least in part data received and/or collected from information data sources 304-304n. The consumer profile may include details of the consumer, including but not limited to a consumer's name, age, address, driver's license number, credit card, or bank information, insurance policies, networked devices associated with the consumer, and privacy preferences, etc. In an embodiment, the consumer may enter additional or confirm information found in their consumer profile through a mobile application or computing device interface. Additional information that may be entered by the consumer includes account details and or verification of online accounts used by a consumer.

Figure 4:
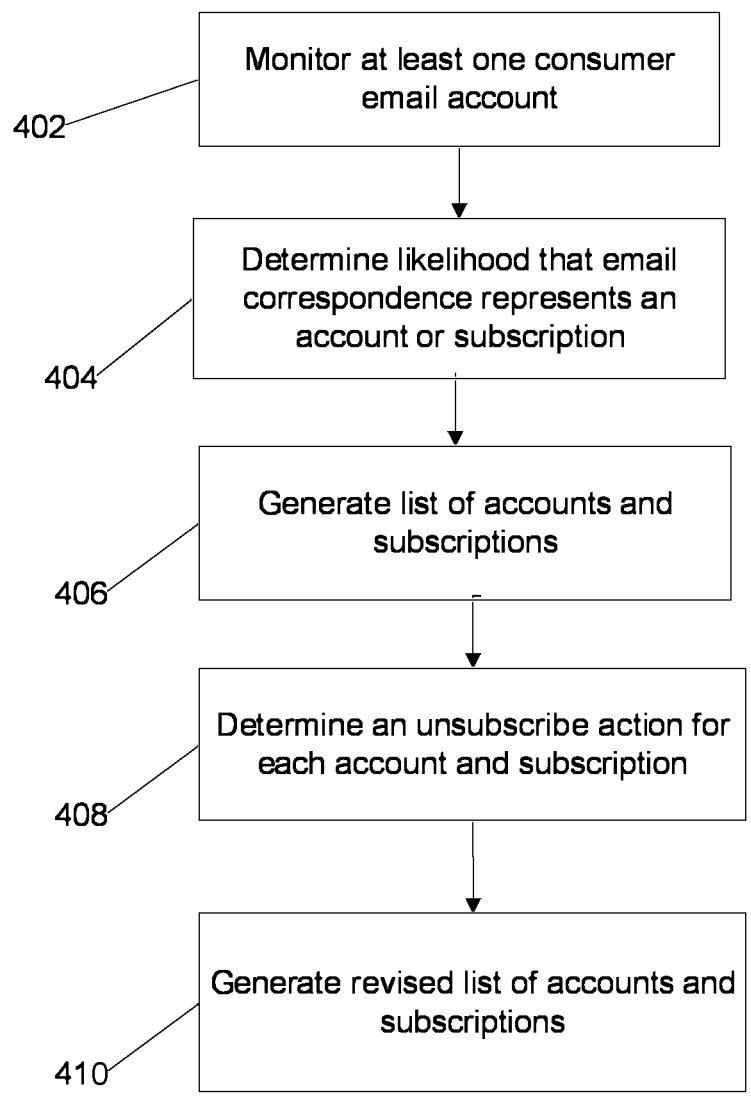
FIG. 4 illustrates an exemplary method in accordance with one or more aspects described herein.

FIG. 4 illustrates an exemplary method in accordance with one or more aspects described herein. In FIG. 4 at step 402, at least one email account of a consumer may be monitored. Cyber-privacy system 201 may, in step 404, determine the likelihood that each email correspondence represents an account or a subscription of the consumer. Cyber-privacy system 201 may in at least one embodiment, determine that an email contains references to an existing subscription based on results from a pattern recognition algorithm. The pattern recognition algorithm may search for various words, phrases, or other identifiable criteria.

In step 406, cyber-privacy system 201 may, based on the determined likelihood that each email correspondence represents an account or subscription of the consumer, generate a list of accounts and subscriptions associated with the consumer. The generated list of accounts and subscriptions may be displayed to the consumer and stored in the consumer profile record.

In step 408, cyber-privacy system 201 may determine, for each account and subscription, an unsubscribe action. The unsubscribe action may comprise a Uniform Resource Locator (URL) and at least one unsubscribe dialog parameter. In step 410, cyber-privacy system 201 may generate a revised list of accounts and subscriptions including the determined unsubscribe action for each account and subscription.

Figure 5:
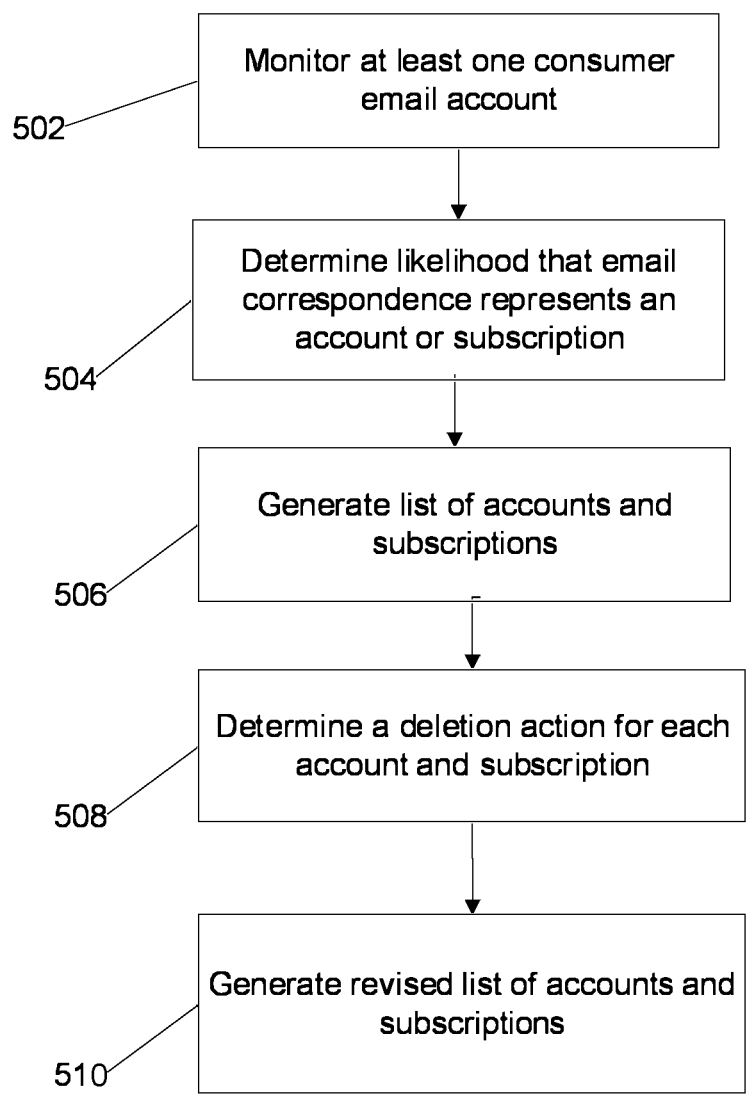
FIG. 5 illustrates another exemplary method in accordance with one or more aspects described herein.

FIG. 5 illustrates an exemplary method in accordance with one or more aspects described herein. In FIG. 5 at step 502, at least one email account of a consumer may be monitored. Cyber-privacy system 201 may, in step 504, determine the likelihood that each email correspondence represents an account or a subscription of the consumer. Cyber-privacy system 201 may in at least one embodiment, determine that an email contains references to an existing subscription based on results from a pattern recognition algorithm. The pattern recognition algorithm may search for various words, phrases, or other identifiable criteria.

Figure 6:
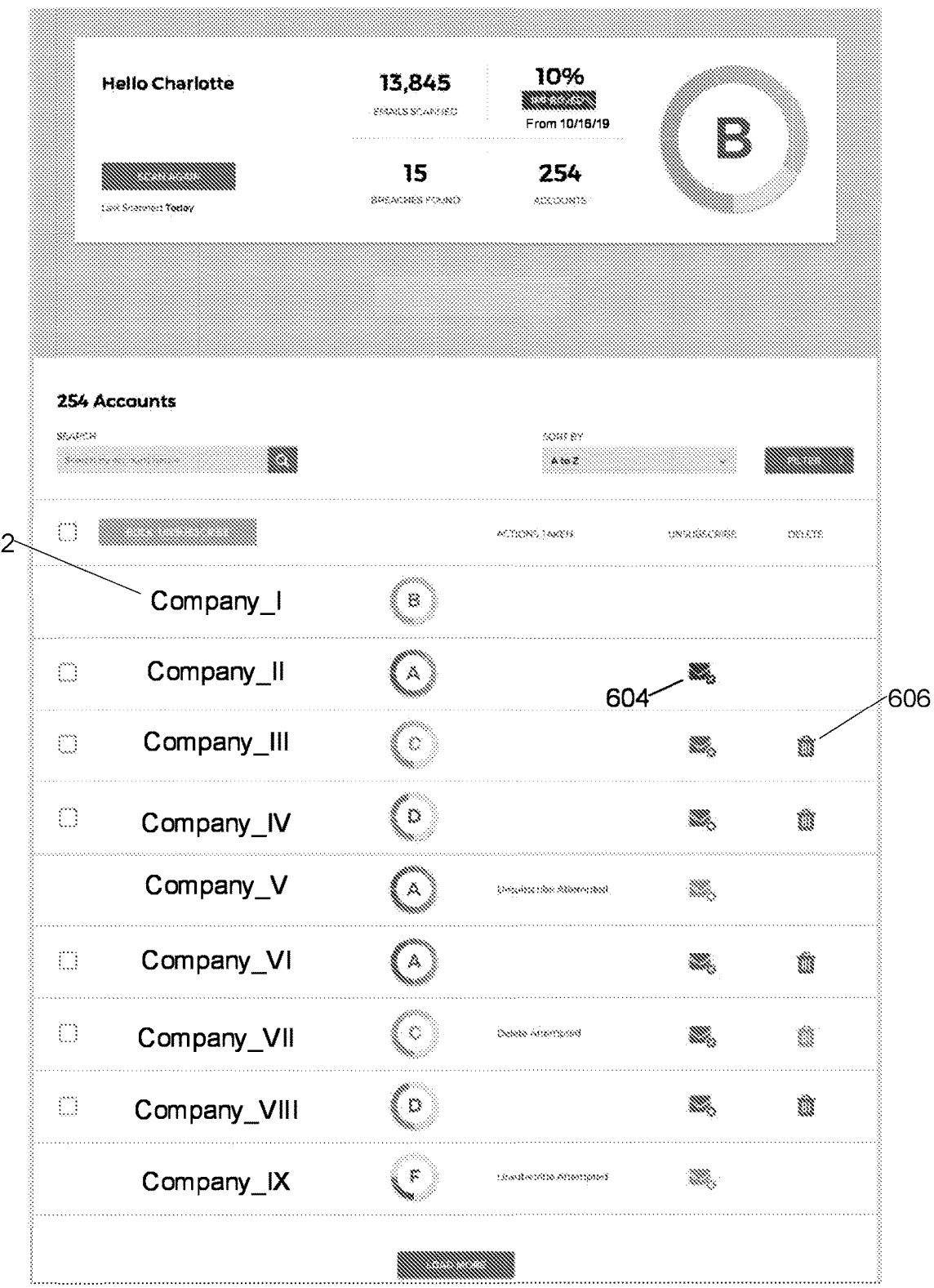
FIG. 6 illustrates an exemplary user interface in accordance with one or more aspects described herein.

In step 506, cyber-privacy system 201 may, based on the determined likelihood that each email correspondence represents an account or subscription of the consumer, generate a list of accounts and subscriptions associated with the consumer. The generated list of accounts and subscriptions may be displayed to the consumer and stored in the consumer profile record. In an embodiment, FIG. 6 illustrates the generated listing of accounts and subscriptions. For instance, FIG. 6 illustrates a discovered consumer account "Company_I" (602), along with its associated icons to initiate unsubscribe (604) and account deletion (606) actions.

In step 508, cyber-privacy system 201 may determine for each account and subscription an account deletion action. The account deletion action may initiate an account deletion process. In an embodiment, the account deletion process may include automatically generating and transmitting an email requesting that the account be deleted by the account provider and that all corresponding data be removed. In another embodiment, the account deletion process may interact with the account website for deleting the user account. In an embodiment, cyber-privacy system 201 may transmit multiple responses if the account deletion requires verification or further account closing information. In step 510, cyber-privacy system 201 may generate a revised list of accounts and subscriptions including the determined deletion action for each account and subscription.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising: one or more processors configured to:
   receive identification of an email account and corresponding login information for a user;

access the email account using the corresponding login information;
analyze individual emails to determine, based on contents of the individual emails, a plurality of user accounts with 3rd party entities;
compile and store a list of the plurality of user accounts with respect to a data store associated with the user;
for at least one of the user accounts, analyze information provided by a 3rd party providing at least one user account, to determine a process for unsubscribing from at least an aspect related to the at least one user account, including determining a series of one or more actions that are identified by the information as actions resulting in unsubscribing;
store, in conjunction with the at least one account identified by the list, the determined series of one or more actions for unsubscribing from the at least the aspect related to the at least one account;
receive an unsubscribe request from the user indicating that the user requests termination, achievable at least via unsubscribing, of the aspect related to the at least one user account;
identify the at least one user account on the stored list;
access the stored determined series of one or more actions for unsubscribing from the at least the aspect;
execute the accessed series of one or more actions to complete unsubscription from the at least the aspect;
determine that the accessed series of one or more actions was unsuccessful in completing unsubscription;
responsive to the series of one or more actions being unsuccessful in completing unsubscription, repeat the analysis of the information and determination of a new series of one or more actions; and
execute the new series of one or more actions to complete unsubscription.

2. The system of claim 1, wherein the unsubscribing from the at least the aspect includes unsubscribing from the at least one account.

3. The system of claim 2, wherein the series of one or more actions for unsubscribing from the at least one account requires credentials related to the at least one account, and wherein the one or more processors are further configured to request the credentials from the user responsive to the request from the user to unsubscribe from the at least one account.

4. The system of claim 2, wherein the unsubscribing from the at least the aspect includes unsubscribing from emails from the $3^{rd}$ party providing the at least one account.

5. The system of claim 1, wherein the processor is further configured to:
identify data elements required by the series of one or more actions to complete unsubscription; and
transmit values, related to the user, for the identified data elements in conjunction with execution of the series of one or more actions.

6. The system of claim 5, wherein the data elements are identified based on analysis of a parameter string included in a link provided by the at least one $3^{rd}$ party for unsubscription.

7. The system of claim 5, wherein the one or more processors are further configured to present a user interface requesting input of at least one value for at least one of the data elements responsive to accessing the stored determined series of one or more actions, when the stored determined series of one or more actions requires the at least one value for the at least one of the data elements.

8. A method comprising:
analyzing individual emails of a user email account to determine, based on contents of the individual emails, a plurality of user accounts with 3rd party entities;
compiling and store a list of the plurality of user accounts with respect to a data store associated with the user;
for at least one of the user accounts, analyzing information provided by a 3rd party providing at least one user account, to determine a process for unsubscribing from at least an aspect related to the at least one user account, including determining a series of one or more actions that are identified by the information as actions resulting in unsubscribing;
storing, in conjunction with the at least one account identified by the list, the determined series of one or more actions for unsubscribing from the at least the aspect related to the at least one account;
receiving an unsubscribe request from the user indicating that the user requests termination, achievable at least via unsubscribing, of the aspect related to the at least one user account; identifying the at least one user account on the stored list;
accessing the stored determined series of one or more actions for unsubscribing from the at least the aspect;
identifying any data elements required by the series of one or more actions to complete unsubscription;
executing the accessed series of one or more actions to complete unsubscription from the at least the aspect;
transmitting values, related to the user, for the identified data elements in conjunction with execution of the series of one or more actions, when at least one data element is identified;
determine that the accessed series of one or more actions was unsuccessful in completing unsubscription;
responsive to the series of one or more actions being unsuccessful in completing unsubscription,
repeat the analysis of the information and determination of a new series of one or more actions; and
execute the new series of one or more actions to complete unsubscription.

9. The method of claim 8, wherein the unsubscribing from the at least the aspect includes unsubscribing from the at least one account.

10. The method of claim 9, wherein the series of one or more actions for unsubscribing from the at least one account requires credentials related to the at least one account, and wherein the method further comprises requesting the credentials from the user responsive to the request from the user to unsubscribe from the at least one account.

11. The method of claim 9, wherein the unsubscribing from the at least the aspect includes unsubscribing from emails from the $3^{rd}$ party providing the at least one account.

12. The method of claim 8, wherein the data elements are identified based on analysis of a parameter string included in a link provided by the at least one $3^{rd}$ party for unsubscription.

13. The method of claim 8, further comprising presenting a user interface requesting input of at least one value for at least one of the data elements responsive to accessing the stored determined series of one or more actions, when at least one data element is identified.

14. A non-transitory storage medium storing instructions that, when executed by one or more processors, cause the one or more processors to perform a method comprising:
analyzing individual emails of a user email account to determine, based on contents of the individual emails, a plurality of user accounts with 3rd party entities;

compiling and store a list of the plurality of user accounts with respect to a data store associated with the user; for at least one of the user accounts, analyzing information provided by a 3rd party providing at least one user account, to determine a process for unsubscribing from at least an aspect related to the at least one user account, including determining a series of one or more actions that are identified by the information as actions resulting in unsubscribing;

storing, in conjunction with the at least one account identified by the list, the determined series of one or more actions for unsubscribing from the at least the aspect related to the at least one account;

receiving an unsubscribe request from the user indicating that the user requests termination, achievable at least via unsubscribing, of the aspect related to the at least one user account; identifying the at least one user account on the stored list;

accessing the stored determined series of one or more actions for unsubscribing from the at least the aspect;

identifying any data elements required by the series of one or more actions to complete unsubscription;

presenting a user interface requesting input of at least one value for at least one of the data elements responsive to accessing the stored determined series of one or more actions, when at least one data element is identified;

executing the accessed series of one or more actions to complete unsubscription from the at least the aspect; and transmitting values, related to the user, for the identified data elements in conjunction with execution of the series of one or more actions, when at least one data element is identified, including the at least one value having been received from the user via the interface;

determine that the accessed series of one or more actions was unsuccessful in completing unsubscription;

responsive to the series of one or more actions being unsuccessful in completing unsubscription, repeat the analysis of the information and determination of a new series of one or more actions; and execute the new series of one or more actions to complete unsubscription.

15. The storage medium of claim 14, wherein the unsubscribing from the at least the aspect includes unsubscribing from the at least one account.

16. The storage medium of claim 15, wherein the series of one or more actions for unsubscribing from the at least one account requires credentials related to the at least one account, and wherein the method further comprises requesting the credentials from the user responsive to the request from the user to unsubscribe from the at least one account.

17. The storage medium of claim 15, wherein the unsubscribing from the at least the aspect includes unsubscribing from emails from the 3rd party providing the at least one account.

* * * * *